Feb. 8, 1949.  R. S. THOMPSON  2,461,245
MOUNTING OF COLLECTOR AND FREE-PISTON GAS GENERATORS
Filed Jan. 30, 1945  3 Sheets-Sheet 1
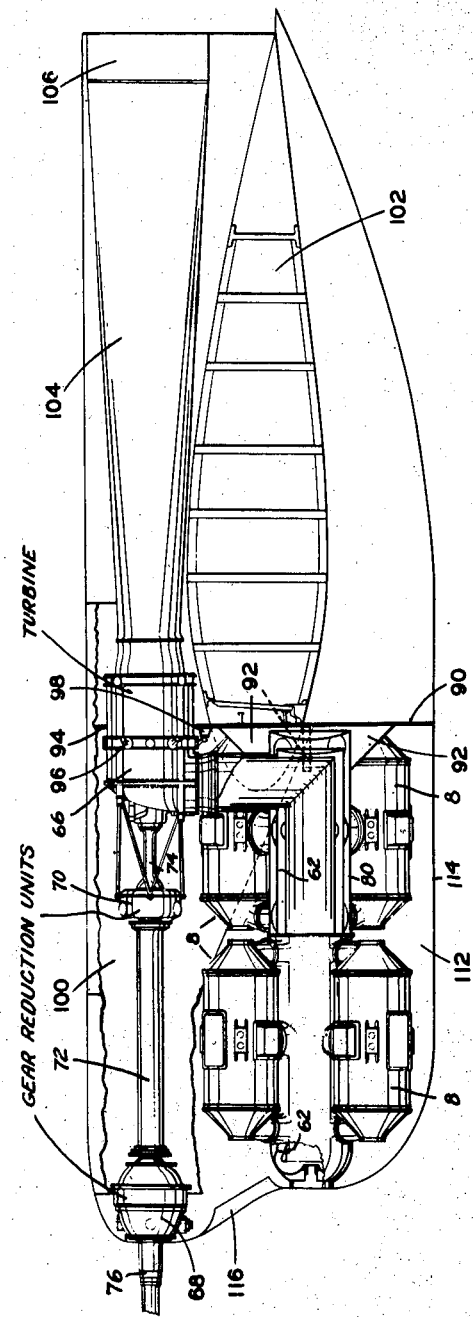
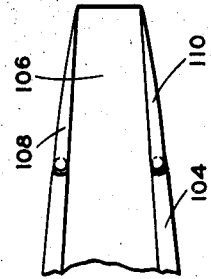
FIG. 4.
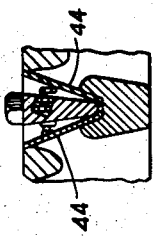
FIG. 5.
INVENTOR
RANSOM S. THOMPSON
ATTORNEY Feb. 8, 1949. R. S. THOMPSON 2,461,245
MOUNTING OF COLLECTOR AND FREE-PISTON GAS GENERATORS
Filed Jan. 30, 1945 3 Sheets-Sheet 3

INVENTOR
RANSOM S. THOMPSON
ATTORNEY

Patented Feb. 8, 1949

2,461,245

UNITED STATES PATENT OFFICE 2,461,245

MOUNTING OF COLLECTOR AND FREE-PISTON GAS GENERATORS

Ransom S. Thompson, East Hampton, Conn., assignor to United Aircraft Corporation, East Hartford, Conn., a corporation of Delaware Application January 30, 1945, Serial No. 575,346

4 Claims. (Cl. 60—44)

This invention relates to the installation in aircraft of a power plant having a number of free-piston generators producing gas under pressure that passes through a burner to a turbine. The turbine drives a propeller and the exhaust gas from the turbine discharges through a thrust nozzle.

In such an aircraft power plant the assembly of the several units in a compact group is desirable to permit mounting of the power plant as a unitary assembly. A feature of this invention is an arrangement for assembling the parts of the power plant to minimize the necessary external supports. Another feature is the arrangement of the parts to cause the essential structural elements to carry the loads without external supporting structure.

A feature of the invention is an arrangement by which the entire power plant may be mounted in a nacelle. This type of power plant utilizes a thrust nozzle through which gas from the turbine discharges as a jet for added propulsive thrust. A feature of the invention is an arrangement of the power plant such that the nozzle may be directly in back of the turbine to eliminate changes in direction of the gas.

A feature of the invention is the accessibility of each of the generators and the turbine without disassembly of the unit.

The copending application of Kalitinsky, Serial No. 531,303, filed April 15, 1944, now patent No. 2,441,196, issued May 11, 1948, describes the location of the several free-piston units around a scavenge collector within which the exhaust collector is located. A burner duct inside the exhaust collector is connected to the turbine inlet. Since the scavenge pressure is necessarily higher than the exhaust pressure the scavenge collector which is relatively cool carries the scavenge pressure loading and the exhaust collector may be heavy enough only to withstand the small pressure differential between the scavenge and exhaust pressures. A feature of this invention is the use of the scavenge collector which is necessarily heavy as the supporting means for the generators. Another feature is the cantilevering of the scavenge collector to a rigid part of the aircraft and the support of the generators on this cantilevered collector. One feature is the direct cantilevering of the generators on the scavenge collector without additional supporting structure.

One feature of the invention is the arrangement of the turbine and the propeller shafts on a single axis with the gear reduction units also on this axis.

Other objects and advantages will be apparent from the specification and claims, and from the accompanying drawings which illustrate an embodiment of the invention.

Fig. 1 is a sectional view through power plant installation.

Fig. 4 is a sectional view of a portion of Fig. 1.

Fig. 5 is a sectional view through the intake valves for the generators.

Figure 3:
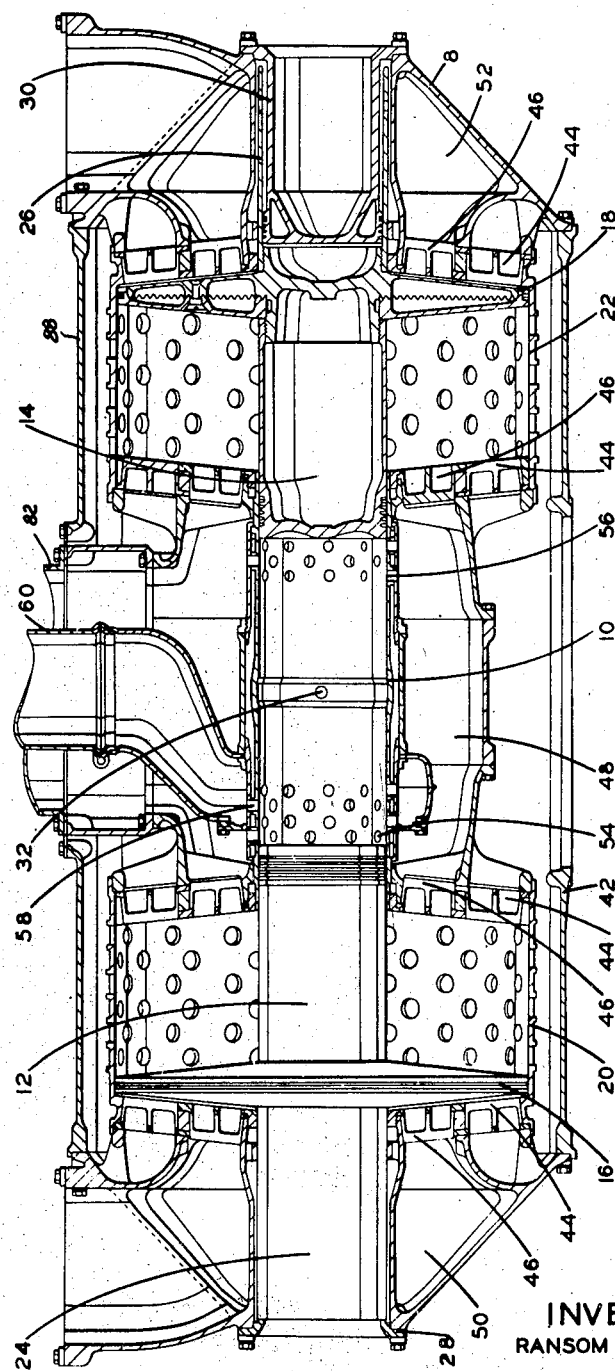
Fig. 3 is a sectional view through one of the generators.

Each generator or free-piston unit 8, as shown in Fig. 3, includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, not shown.

Intake manifold 42 which extends around the compressor and engine cylinders, conducts air to intake valves 44, shown in detail in Fig. 5, in the heads of the compressor cylinders through which air alternately enters opposite ends of the cylinders. The compressed air leaves the cylinders through discharge valves 46, similar to valves 44, and also at opposite ends of the compressor cylinders, and passes into a central scavenge chamber 48 and end chambers 50 and 52. These chambers may be interconnected by a scavenge manifold, not shown. The valves are preferably flap valves of the general arrangement shown in the Huff patent No. 1,780,524.

Compressed gas from the scavenge chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60.

Exhaust gas from the generators is discharged into an exhaust collector 62 to which the exhaust manifolds 60 are connected. In the arrangement shown, the generators are arranged in groups of four, substantially uniformly spaced about the collector, the groups being longitudinally spaced from each other along the collector. In this way the collector extends centrally through each of the groups of generators. In the arrangement shown, each group of generators is made up of four generators and there are two groups of generators so that the collector receives gas from all the generators. With the arrangement of the generators as shown, each generator is readily accessible for inspection and maintenance, and each generator may be individually removed from the power plant without affecting the other generators.

Gas from the exhaust collector passes through a burner 64, the discharge end of which is connected by a duct 65 to the inlet of a turbine 66 or other receiver for the hot gas. If the power plant is used for aircraft the turbine may be connected through gear reduction units 68 and 70, and shafts 72 and 74 to a shaft 76 on which a propeller system may be mounted.

The burner 64, as shown, is a continuous duct from the inlet end, which as shown, is slightly spaced from the end of the collector 62 to permit gas to enter the burner. The burner is spaced for its entire length from the walls of the exhaust collector and gas entering the collector from the generators flows along the outer surface of the burner duct and into the inlet end of the duct. In this way, the duct may be made of a relatively thin material since it carries no pressure loads, and the duct is continually cooled by the flow of exhaust gas over its outer surface.

Fuel may be introduced through a nozzle 78 at the end of the burner to be burned within the burner duct, thereby increasing the energy of the gas delivered to the turbine.

The exhaust collector is surrounded by a scavenge collector 80 which receives the scavenge gas from the generator at a pressure slightly higher than the pressure of the exhaust gas in the exhaust collector. The scavenge collector is necessarily cooler than the enclosed exhaust collector and the latter forms a heat shield between the burner and the scavenge collector.

Figure 2:
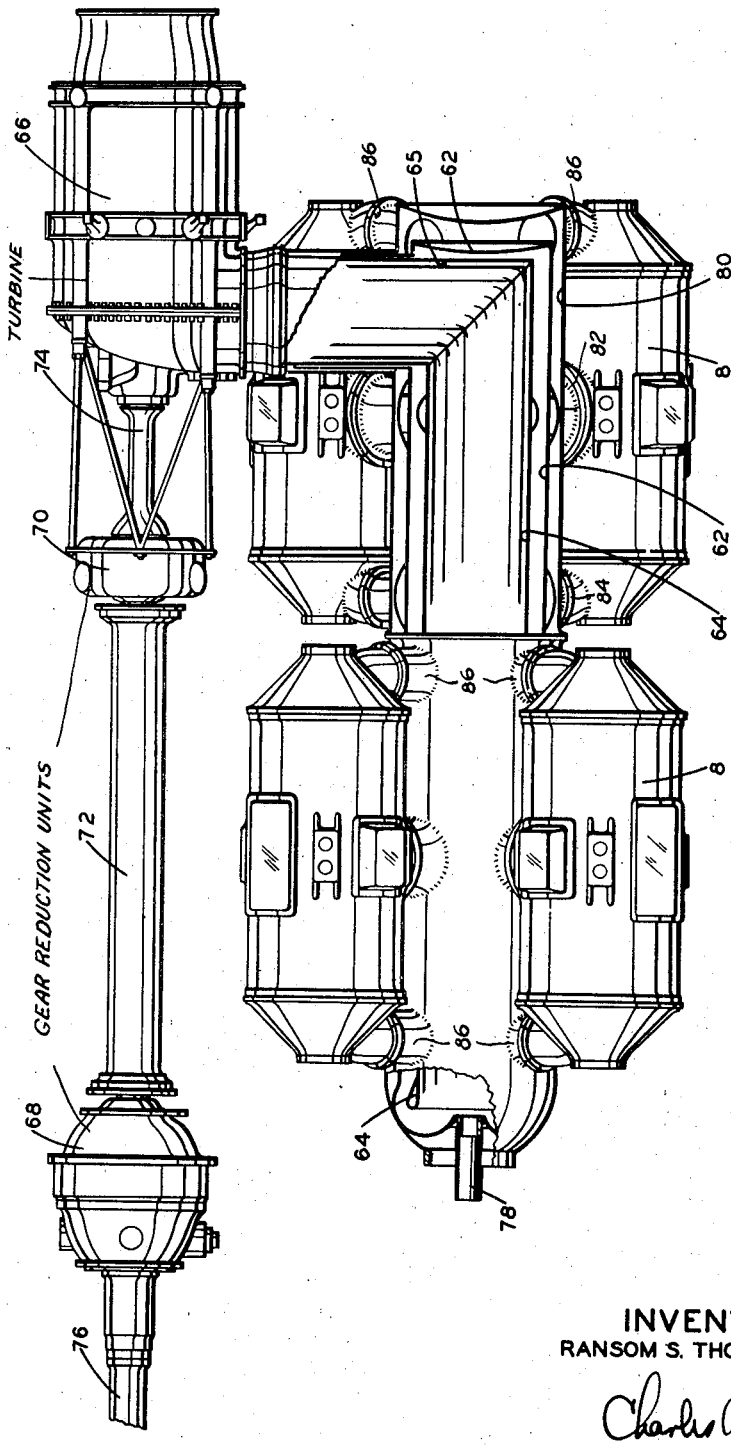
Fig. 2 is a sectional view on a larger scale of the power plant separate from the aircraft.

The central scavenge manifold 48 is connected, as shown in Fig. 3, to a flanged connection 82 on the scavenge collector 80 and the end scavenge chambers 50 and 52 are attached to mounting flanges 84 and 86, Fig. 2, on the scavenge collector. The outer case 88, Fig. 3, for the generator which constitutes the intake manifold is heavy enough so that the entire weight of the generator may be supported by this case. Also flanges 82, 84 and 86 can transmit the load of each generator to the exhaust collector 80. As above stated, this collector is necessarily heavy to withstand the scavenge pressure, and it may be made heavy enough also to support the weight of the several generators.

As shown in Fig. 1, the scavenge collector is supported on the fire wall 90 by a number of gussets 92 which extend between the collector and the fire wall. The scavenge collector is thus cantilevered to the fire wall as the gussets 92 form the entire structural support for the scavenge collector as well as the generators mounted on the collector in which the fire wall has an opening 94 through which the turbine extends and the mounting brackets 96 on the turbine may be connected through mounting pads 98 to the fire wall.

A monocoque structure 100 connected to the wing 102 to which the fire wall is also connected extends forwardly of the wing to support the reduction unit 68 and to carry the thrust loads resulting from the propeller rotation.

A duct 104 extends directly rearward from the turbine discharge to a nozzle 106 which may be made adjustable by having the opposed side walls, Fig. 4, made up of vanes 108 and 110 pivoted adjacent the leading edges and movable toward and away from each other to control the area of the discharge nozzle. By this arrangement the thrust nozzle may be located directly rearwardly of the turbine and by locating the turbine above the wing structure, as shown, it is possible to have the duct 104 entirely separate from the wing structure.

As will be apparent the entire power plant is included in a single nacelle 112. By arrangement of the power plant with the generators arranged in groups around the exhaust collector it will be apparent that suitable openings may be provided in the outside wall 114 of the nacelle to provide access to any one of the generators individually in the event that repair is necessary. The mounting of the several generators is such that any one of the generators may be removed from the power plant without removing the power plant from the nacelle, since each generator is supported only by the three mounting flanges on the scavenge collector. The outer shell of the nacelle may have an inlet opening 116 through which air may reach the generators.

It is to be understood that the invention is not limited to the specific embodiment herein illustrated and described, but may be used in other ways without departure from its spirit as defined by the following claims.

I claim:

1. A power plant including a scavenge collector, an exhaust collector within the scavenge collector, a number of free-piston gas generators arranged around the collector and discharging into the collector, each generator having a plurality of scavenge chambers, said collector having an opening with a surrounding flange for each scavenge chamber, said chambers having openings communicating directly with said collector openings and having surrounding flanges cooperating with the flanges on the collector, said cooperating flanges being connected together and constituting the sole support for the generators on the collector, and an exhaust duct from each generator to the exhaust collector.

2. A power plant including a scavenge collector, an exhaust collector within the scavenge collector, a number of free piston units around the scavenge collector, each unit having a scavenge opening, and a surrounding flange adapted to be connected to the scavenge collector, and said unit having an exhaust pipe extending through the scavenge opening and connected to the exhaust collector, said scavenge collector supporting each generator by said surrounding flange.

3. In a power plant installation, an aircraft having a structural element, in combination with a power plant including a gas collector, and a number of free-piston gas generators around the gas collector, said gas collector being mounted adjacent one end on the structural element, said collector extending outwardly from the element in the form of a cantilever and said generators being connected to and supported by said collector.

4. In a power plant installation, an aircraft having a structural element, in combination with a power plant including a gas collector, and a number of free-piston gas generators around the gas collector, said gas collector being mounted on and cantilevered from the structural element, said collector extending outwardly from the element in the form of a cantilever and said generators being individually cantilevered on the collector.

RANSOM S. THOMPSON.

REFERENCES CITED

The following references are of record in the file of this patent:

UNITED STATES PATENTS

| Number | Name | Date |
|---|---|---|
| 1,187,293 | Faurot | June 13, 1916 |
| 1,194,560 | Snyder | Aug. 15, 1916 |
| 1,343,473 | Pflaume | June 15, 1920 |
| 1,620,565 | McKeown | Mar. 8, 1927 |
| 1,705,492 | Noble | Mar. 19, 1929 |
| 1,980,997 | Jenkins | Nov. 20, 1934 |
| 2,232,631 | Renick | Feb. 18, 1941 |
| 2,242,198 | Woods | May 13, 1941 |
| 2,292,288 | Pateras Pescara | Aug. 4, 1942 |

FOREIGN PATENTS

| Number | Country | Date |
|---|---|---|
| 526,104 | Great Britain | Sept. 11, 1940 |
| 870,648 | France | Dec. 22, 1941 |
| 565,359 | Germany | Aug. 31, 1933 |
| 495,469 | Great Britain | Dec. 15, 1938 |